(12) United States Patent
Fattal et al.

(10) Patent No.: US 7,305,144 B2
(45) Date of Patent: Dec. 4, 2007

(54) SYSTEM AND METHOD FOR COMPRESSING THE DYNAMIC RANGE OF AN IMAGE

(75) Inventors: Raanan Fattal, Jerusalem (IL); Daniel Lischinski, Jerusalem (IL); Michael Werman, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 712 days.

(21) Appl. No.: 10/813,691

(22) Filed: Jan. 15, 2003

(65) Prior Publication Data
US 2005/0254722 A1    Nov. 17, 2005

(51) Int. Cl.
*G06K 9/40* (2006.01)
(52) U.S. Cl. ................................. 382/274; 382/254
(58) Field of Classification Search ................ 382/274, 382/275, 254
See application file for complete search history.

(56) References Cited

U.S. PATENT DOCUMENTS 5,881,181 A * 3/1999 Ito .......................... 382/274
6,757,645 B2 * 6/2004 Chang et al. ................. 703/13
6,973,218 B2 * 12/2005 Alderson et al. ........... 382/260
6,985,615 B2 * 1/2006 Shinbata ..................... 382/132
6,993,200 B2 * 1/2006 Tastl et al. .................. 382/240

OTHER PUBLICATIONS

LCIS: A Boundary Hierarchy for Detail-Preserving Contrast Reduction, Tumblin et al., Siggraph 99, pp. 83-90.*

* cited by examiner

*Primary Examiner*—Bhavesh M Mehta
*Assistant Examiner*—John B Strege

(57) ABSTRACT

A gradient domain compression system generates, from an input image having a high luminance dynamic range, an output image having a lower luminance dynamic range. The system comprises a gradient image generator module, a gradient compression module, and an output image generator module. The gradient image generator module is configured to generate, from the input image, a gradient image representing, for respective points of the input image, gradient values in the luminance of the input image. The gradient compression module is configured to receive the gradient image and generate a compressed range gradient image in which the range of gradient values are compressed. The output image generator module is configured to receive the compressed range gradient image and to generate therefrom an image, the image generated by the output image generator module comprising the output image.

30 Claims, 1 Drawing Sheet

SYSTEM AND METHOD FOR COMPRESSING THE DYNAMIC RANGE OF AN IMAGE

FIELD OF THE INVENTION

The invention relates generally to the field of computer image processing, and more particularly to systems and methods for compressing the dynamic range of an image.

BACKGROUND OF THE INVENTION

High dynamic range ("HDR") images are becoming increasingly common in a number of applications. A HDR image of a scene can be generated by conventional computer graphics techniques. A HDR image of a scene can also be constructed from a series of photographs taken by an image capture device of the scene at different shutter speeds or under different lighting conditions. Typically, the various photographs taken at different shutter speeds, for example, will reveal different details of the objects in the scene. Using one or more of several known techniques, the photographs can be combined to provide a single image that can contain details of the various objects in the scene that may be visible in one or more, but not necessarily all, of the photographs, and which has a relatively high dynamic range of luminance, that is, the brightness at respective points in the image. It is not unreasonable to expect that, in the not too distant future, image capture devices may be developed that have the capability of capturing HDR images.

A problem arises with such HDR images, since conventional computer video display or other output devices, such as monitors, printers, and the like have a much lower dynamic range than the HDR images. For example, using one or more of various techniques, it is possible to produce an HDR image with a dynamic range of on the order of 25,000:1, whereas the dynamic range of a typical display monitor is on the order of 100:1. Accordingly, in order to display such an HDR image on a conventional output device, it would be necessary to compress the dynamic range of the image to accommodate the capabilities of the particular output device or devices that are to be used for outputting the image.

Several methodologies have been proposed to reduce the dynamic range of an HDR image to allow the image to be accommodated by conventional output devices. Previous methodologies can be generally divided into two broad groups, namely, (i) global, or spatially invariant, mappings, and
(ii) adaptive, or spatially variant, mappings.

Spatially invariant mapping methodologies generally map the luminance values such that two pixels in an HDR image that have the same value, are mapped to the same value for use with the output device. On the other hand, adaptive mapping methodologies, may provide different values based on the characteristics of the HDR image. In both cases, the methodologies also take into account the characteristics of the particular target output device or devices that will be used for the resulting image, which will be referred to as a low-dynamic-range ("LDR") image.

Spatially invariant mapping methodologies are typically simpler to implement since, once a mapping has been developed using the global characteristics of the HDR image and the characteristics of the target output device(s), the LDR image can generally be generated using, for example, look-up tables. Several spatially invariant mapping methodologies have been developed. Some methodologies scale, either in a linear manner or a non-linear manner, the dynamic range of the HDR image to provide the LDR image. Linear scaling is relatively simple to carry out, and it preserves relative contrasts in a perfect fashion, but a severe loss of visibility of elements of the image can occur, particularly if the output device's dynamic range is significantly lower than the dynamic range of the image. Other spatially invariant mapping methodologies make use of histograms or gamma correction to develop mappings.

Several spatially variant mapping methodologies, of varying degrees of complexity, have been developed. Typically, in a spatially variant mapping methodology, it is assumed that, each point in an image I of a scene can be represented by the product of a reflectance function R and an illuminance function L. The reflectance function for the image is commonly referred to as the intrinsic image of the scene. The largest luminance variations in an HDR image come from the illuminance function, since in the real world reflectances are unlikely to create large contrasts. Thus, in principle the LDR image can be generated by separating the image I into its R and L components, compressing the L component to provide a compressed illuminance L', and generating the LDR image I' as the product of R and L'. In principle, this should provide an LDR image in which contrasts between highly illuminated areas and areas in deep shadows in the HDR image are reduced, while leaving contrasts due to texture and reflectance undistorted.

Problems arise in the spatially invariant mapping methodologies as described above, since separating the image I into the reflectance R and illumination L components is an ill posed problem. To accommodate that, typically some simplifying assumptions are used regarding R, L or both. In accordance with one assumption, it is assumed that the illumination function L varies slowly across an image, in comparison to the reflectance function R, which can vary abruptly. Under that assumption, the reflectance function L and the illumination function L can be separated by initially taking the logarithm of the image I. It will be appreciated that the logarithm of the image I is the sum of the logarithms of R and L. The sum can be low-pass filtered, with the low frequencies defining the logarithm of L and the high frequencies defining the logarithm of R. The logarithm of L and the logarithm of R can be separately exponentiated, to provide the assumed illumination and reflectance functions L and R, which can be processed as described above. Alternatively, subjecting the logarithm of I to high-pass filtering, followed by exponentiation, can achieve simultaneous dynamic range compression and local contrast enhancement.

The methodology described in the preceding paragraph works well under some circumstances. However, in a number of circumstances, the assumption that the illumination L varies only slowly is violated. For example, in sunlit scenes in which a shadow is cast, the illumination function L varies abruptly across the shadow boundary. In that case, the illumination function L would also have high frequencies, in which case attenuating only the low frequencies may give rise to various "halo" artifacts in the resulting LDR image around abrupt changes in illumination. Various methodologies have been proposed to vary the methodology to eliminate the halo effects, but many of them are computationally intensive, or they do not totally eliminate the haloing, or they may result in other artifacts being generated.

SUMMARY OF THE INVENTION

The invention provides a new and improved system and method for compressing the dynamic range of an image.

Generally, the invention makes use of the observation that the human visual system is not as sensitive to the absolute luminances reaching the eye, as to local changes in the ratios of the intensities, and further that the human visual system reduces the effect of large global differences, which may be associated with differences in illumination over the scene. The invention further makes use of the observation that drastic changes in the luminance of an image gives rise to gradients in the luminance of large magnitudes at some scale. On the other hand, fine details, such as textures, have luminances with much lower gradients. In accordance with those observations, a system in accordance with invention identifies large gradients at various scales, and attenuates their magnitudes, while leaving the directions of the gradients unchanged. The attenuation is progressive, so as to reduce relatively high gradients more than somewhat lower gradients. On the other hand, a system in accordance with the invention preserves fine details by increasing relatively low gradients, also in a progressive manner. The result is to compress the gradients. Such a system converts the compressed gradients into an image whose luminance has a lower dynamic range (an LDR image) relative to the dynamic range of the luminance of the original image.

In brief summary, the invention provides a gradient domain compression system for generating, from an input image having a high luminance dynamic range, an output image having a lower luminance dynamic range. The system comprises a gradient image generator module, a gradient compression module, and an output image generator module. The gradient image generator module is configured to generate, from the input image, a gradient image representing, for respective points of the input image, gradient values in the luminance of the input image. The gradient compression module is configured to receive the gradient image and generate a compressed range gradient image in which the range of gradient values are compressed. The output image generator module is configured to receive the compressed range gradient image and to generate therefrom an image, the image generated by the output image generator module comprising the output image.

In embodiments of the system, the gradient compression module comprises a gradient attenuation function generator module and an attenuated image gradient generator module. The a gradient attenuation function generator module is configured to generate, for respective points in the gradient image, a gradient attenuation function whose value for respective points in the gradient image is configured to reduce the range of gradient values in the gradient image. The attenuated image gradient generator module is configured to generate, from the gradient image and the gradient attenuation function, the compressed range gradient image.

In embodiments of the system, the gradient attenuation function generator module is configured to generate the gradient attenuation function in relation to a Gaussian pyramid defining gradient values at various resolution levels.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
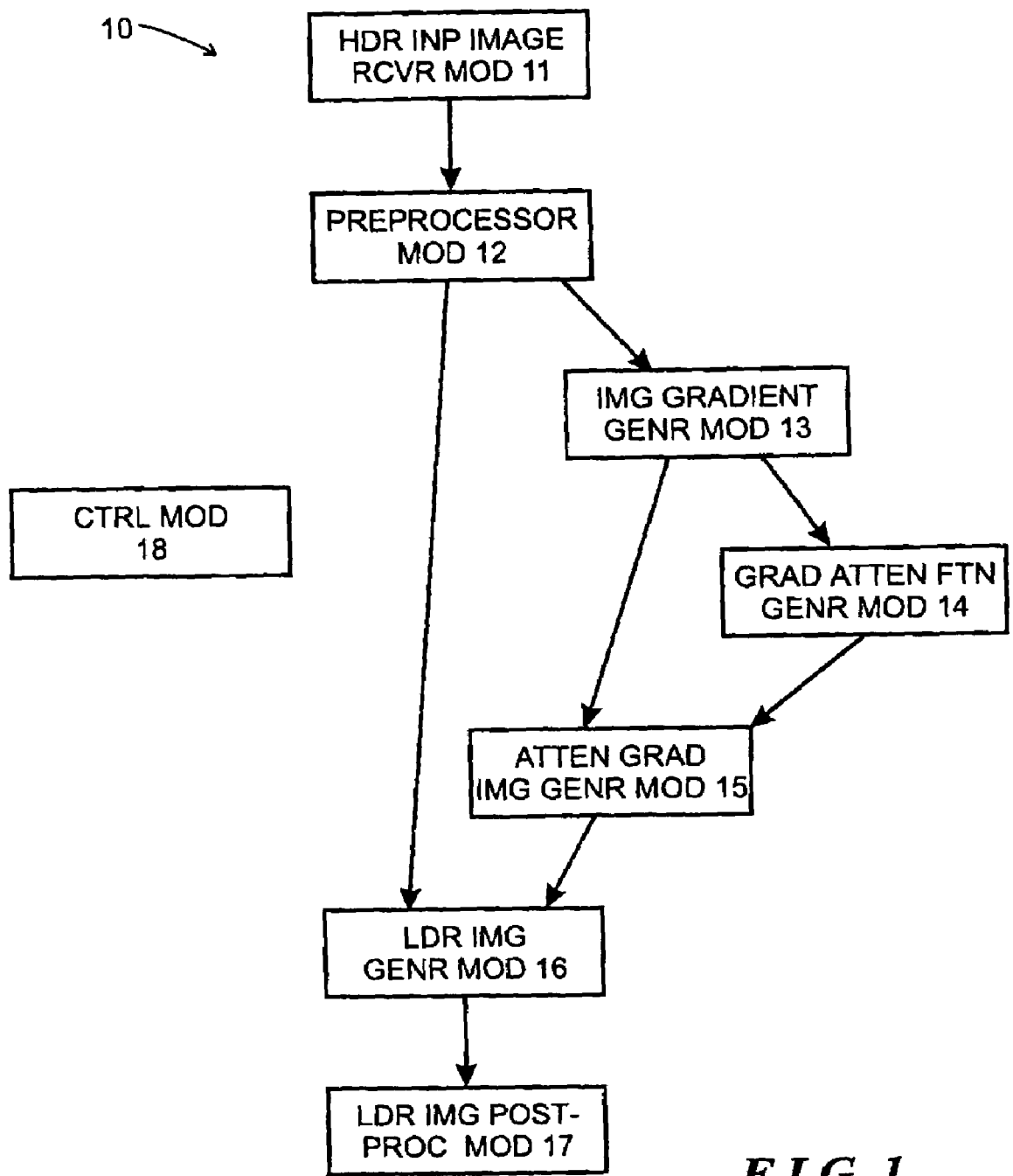
FIG. 1 is a functional block diagram of a gradient domain HDR compression system constructed in accordance with the invention.

FIG. 1 is a functional block diagram of a gradient domain high-dynamic-range ("HDR") compression system 10 constructed in accordance with the invention. The gradient domain HDR compression system 10 receives a HDR image and generates therefrom a low-dynamic-range ("LDR") image that can be accommodated by an output device such as, for example, a video display, a printer or other output device.

The gradient domain HDR compression system 10 is designed with reference to two general observations. First, the human visual system is not as sensitive to the absolute luminances reaching the eye, as to local changes in the ratios of the intensities, and further that the human visual system reduces the effect of large global differences, which may be associated with differences in illumination over the scene. In addition, drastic changes in the luminance of an image gives rise to gradients in the luminance of large magnitudes at some scale. On the other hand, fine details, such as textures, have luminances with much lower gradients. In accordance with those observations, the invention identifies large gradients at various scales, and attenuates their magnitudes, while leaving the directions unchanged. The attenuation is progressive, so as to reduce relatively high gradients more than somewhat lower gradients. On the other hand, fine details are preserved, by increasing relatively low gradients, also in a progressive manner. The result is to compress the gradients. The compressed gradients are converted into an image that has a dynamic range (an LDR image) whose luminance is compressed relative to the dynamic range of the luminance of the original image With reference to FIG. 1, the gradient domain HDR compression system 10 includes an input image receiver module 1, an input image preprocessor module 12, a preprocessed image gradient generator module 13, a gradient attenuation function generator module 14, an attenuated gradient image generator module 15, a low dynamic range ("LDR") image generator module 16, and an image post-processor module 17, all under control of a control module 18. Details of the operations performed by each of the modules will be described below. Generally, under control of the control module 18, the input image module 11 receives an input HDR image from an HDR image source (not shown). The HDR image may be generated by any convenient methodology, or it may be generated by any image capture device. In any case, after receiving the HDR image, the input image receiver module 11 couples the HDR image to the input image preprocessor module 12.

The input image preprocessor module 12 performs two operations. If the input HDR image is a color image, the input image extracts the luminance information and color channel information for the various color channels comprising the input HDR image. The luminance information and the color channel information may be used by the image post-processor module 17, as will be described below. The luminance information defines a "luminance channel HDR input image," irrespective of the colors that may comprise the image. In addition, the input image preprocessor module 12 generates from the luminance channel HDR input image a preprocessed input image that is the logarithm of the luminance channel HDR input image. As is conventional, an image comprises an array of elements, which are generally referred to as pixels, that are arranged in a plurality of rows and columns. In the HDR input image, each array element comprises a value that defines the luminance channel HDR input image at the respective location in the image. In generating the preprocessed input image, the input image preprocessor module 12 generates an array having elements arranged in the same number of rows and columns as the luminance channel HDR input image, with array element containing a value that corresponds to the logarithm of the value in the corresponding array element of the array that defines the luminance channel HDR input image. More specifically, if the array defining the luminance channel HDR input image is referred to as "M" and the array defining the preprocessed input image is referred to as "H," the value in array element H(x,y) (where "x" and "y" refer to the row and column, respectively, of the array element) corresponds to the logarithm of the value in array element M(x,y). The input image preprocessor module 12 may use any convenient logarithm base.

After the input image preprocessor module 12 has generated the preprocessed input image array H, it will provide the preprocessed input image array H to the preprocessed image gradient generator module 13. The preprocessed image gradient generator module 13 generates a gradient array that represents the gradients of the values in the array defining the preprocessed input image that it received from the input image preprocessor module 12. The gradient array, which will be referred to as "∇H," has an array of elements arranged in the same number of rows and columns as the preprocessed input image array H, with each array element ∇H(x,y) containing two values that together serve to define the gradient of the luminance at location (x,y) in the preprocessed input image array H. The values correspond to the horizontal and vertical components of the gradient at the respective location (x,y).

After the processed image gradient generator module 13 has generated the gradient array ∇H, it will provide the gradient array ∇H to both the gradient attenuation function generator module 14 and the attenuated gradient image generator module 15. The gradient attenuation function generator module 14 generates a gradient attenuation function, which will be referred to as "Φ," which will be used to attenuate the values in the array elements comprising the gradient array ∇H. As with the gradient array ∇H, the gradient attenuation function comprises an array having a plurality of array elements arranged the same number of rows and columns as the gradient array ∇H. Each array element Φ(x,y) contains an attenuation value that will be used to attenuate the values in the corresponding array element ∇H(x,y) of the gradient array ∇H. The gradient attenuation function generator module 14 generates the attenuation values so that relatively large gradients are reduced and relatively small gradients are increased, with the reduction or increase being performed in a progressive manner. That is, for the gradients that are to be reduced, larger gradients will be reduced more than smaller ones. Similarly, for the gradients that are to be increased, lower gradients will be increased more than smaller ones. This serves to compress, or decrease the range of, the values of the gradients in the gradient array ∇H, which, as will be described, serves to provide a reduction in the dynamic of the image that is generated by the gradient domain HDR compression system 10.

After the gradient attenuation function generator module 14 has generated the gradient attenuation function Φ, it will provide the gradient attenuation function Φ to the attenuated gradient image generator module 15. The attenuated gradient image generator module will use both the gradient attenuation function Φ and the gradient array ∇H to generate an attenuated gradient array, which will be referred to as G. As with the gradient array ∇H, the attenuated gradient array comprises a plurality of array elements arranged in the same number of rows and columns as the gradient array ∇H. Each array element G(x,y) contains two values, corresponding to the values of the horizontal and vertical components of the gradient in the corresponding array element ∇H(x,y) of the gradient array ∇H, both of which are attenuated according to the attenuation value in the corresponding location Φ(x,y) in the gradient attenuation function Φ.

After the attenuated gradient image generator module 15 has generated the attenuated gradient array G, it will provide the attenuated gradient array G to the low dynamic range ("LDR") image generator module 16. The LDR image generator module 16 performs two operations. Initially, it will receive the attenuated gradient array G and generate therefrom an LDR image array, which will be referred to as I. As with the array comprising the attenuated gradient array G, the LDR image array comprises a plurality of array elements arranged in the same number of rows and columns as the attenuated gradient array G. Each array element I(x,y) contains a value that corresponds to the luminance of the LDR image. It will be appreciated that, since the luminance values in the LDR image array I are generated from the attenuated gradient values in the attenuated gradient array, the dynamic range of the luminance values in the LDR image array I will be reduced from the dynamic range of the luminance channel HDR input image "M."

After the LDR image generator module 16 has generated the LDR image array I, since the processing was performed in the logarithmic domain, the LDR image generator module 16 will exponentiate the LDR image array I to generate an exponentiated LDR image array $I_E$. The exponentiated LDR image array $I_E$ comprises a plurality of array elements arranged in the same number of rows and columns as the LDR image array. Each array element $I_E(x,y)$ receives a value that corresponds to the value in the corresponding location of the array element I(x,y) in the LDR image array I, exponentiated using any convenient base.

After the LDR image generator module 16 has generated the exponentiated LDR image array $I_E$, it will provide the array $I_E$ to the image post-processor module 17. The image post-processor module 17 will receive the exponentiated LDR image array $I_E$ and perform several operations. First, if the original HDR image was a color image and the LDR image is also to be a color image, the image post-processor module can make use of the exponentiated LDR image array $I_E$ and color channel information that it receives from the input image pre-processor module 12 to generate a color LDR image array $I_C$. As with the array comprising the LDR image array I, the color LDR image array $I_C$ comprises a plurality of array elements arranged in the same number of rows and columns as the LDR image array I. Each array element $I_C(x,y)$ contains a plurality of values, each associated with one of the color channels. Typically, three color channels are used, one each for colors red, blue, and green, although it will be appreciated that both other colors may be used, and the number of color channels may differ from three. The image post-processor module 17 will use the color channel information for the respective colors and the values in the array elements $I_E(x,y)$ to generate values for the various color channels for the respective array elements $I_C(x,y)$ of the color LDR image array $I_C$. In addition, the image post-processor module 17 can scale and shift the values in the color LDR image array $I_C$, or the exponentiated LDR image array $I_E$ if the LDR image is not to be a color image, to accommodate requirements and limitations of the specific output device that is to be used to output the LDR image.

As noted above, the gradient domain HDR compression system described above in connection with FIG. 1 generates a LDR image from a HDR image by adjusting the gradients of the luminance in the HDR image, generally reducing the gradients in regions in which the gradients in the HDR image are relatively high, and increasing the gradients in regions in which the gradients in the HDR image are relatively low. The reduction or increase is performed in a progressive manner. By way of background, given an HDR image, the logarithm of whose luminance is defined by a function H(x,y), a function G(x,y) can be defined as follows:

$$G(x,y) = \nabla H(x,y)\Phi(x,y) \quad (1),$$

where $\nabla H(x,y)$ (which corresponds to the gradient array $\nabla H$ described above) represents the gradient of H(x,y) at the point in the image having coordinates (x,y), and $\Phi(x,y)$ (which corresponds to the gradient attenuation function $\Phi$ described above) represents the value of an attenuation function that is generated for the point (x,y), which attenuation function is a function of the magnitude of the gradient at that point. It will be appreciated that, in connection with equation (1)

(i) H(x,y) corresponds to the preprocessed input image H described as being generated by the image pre-processor module 12, (ii) $\nabla H(x,y)$ corresponds to the gradient array $\nabla H$ described as being generated by the preprocessed image gradient generator module 13;

(iii) $\Phi(x,y)$ corresponds to the gradient attenuation function $\Phi$ described as being generated by the gradient attenuation function generator module 14; and (iv) G(x,y) corresponds to the attenuated gradient image G described as being generated by the attenuated gradient image generator module 15.

In one embodiment, the gradient domain HDR compression system uses G(x,y) defined above to determine the LDR image, as follows. If I (which corresponds to the LDR image array I described above as being generated by the LDR image generator module 16) defines the logarithm of the LDR image that is to be generated, the gradient domain HDR compression system can determine I by performing a search to determine the function whose gradient field is closest to G in the least-squares sense, that is:

$$I = \arg\min_I \int\int F(\nabla I, G) dx\, dy, \quad (2)$$

where "G" is as in equation (1) and $$\frac{\partial F}{\partial I} - \frac{d}{dx}\frac{\partial F}{\partial I_x} - \frac{d}{dy}\frac{\partial F}{\partial I_y} = 0, \quad (3)$$

where $G_x$ and $G_y$ represent the x and y components of G, respectively. According to the Variational Principle provided by the calculus of variations, the function "I" that minimizes the integral in (2) is the function that satisfies the Euler-Lagrange equation $$F(\nabla I, G) = \|\nabla I - G\|^2 = \left(\frac{\partial I}{\partial x} - G_x\right)^2 + \left(\frac{\partial I}{\partial y} - G_y\right)^2,$$

where "$I_x$" and "$I_y$" represent the "x" and "y" components, respectively of "I."

It will be appreciated that equation (3) is a partial differential equation in "I." Substituting the definition for "F" as given above into equation (3), the following equation is obtained:

$$2\left(\frac{\partial^2 I}{\partial x^2} - \frac{\partial G_x}{\partial x}\right) + 2\left(\frac{\partial^2 I}{\partial y^2} - \frac{\partial G_y}{\partial y}\right) = 0. \quad (4)$$

Cancelling the common factor of "2" in equation (4) and rearranging, $$\frac{\partial^2 I}{\partial x^2} + \frac{\partial^2 I}{\partial y^2} = \frac{\partial G_x}{\partial x} + \frac{\partial G_y}{\partial y}, \quad (5)$$

which can also be written $$\nabla^2 I = \text{div} G$$

where "$\nabla^2 I$" represents the application of the Laplacian operator $$\nabla^2 = \frac{\partial^2}{\partial x^2} + \frac{\partial^2}{\partial y^2}$$

to the scalar function "I", and "div G" represents application of the divergence operator (which is abbreviated "div," and is the "dot product" of the "$\nabla$" operator $$\frac{\partial}{\partial x}i + \frac{\partial}{\partial y}j$$

to the "x" and "y" components of a vector, where "i" and "j" refer to the basis vectors for the "x" and "y" components of the vector) to the vector function "G."

It will be appreciated that equation (6) defines the LDR image, which is a function of "I," in terms of "G." As described above in connection with equation (1), because "G(x,y)" is defined in terms of "H(x,y)," which, in turn, represents the logarithm of the luminance of the original HDR image, the luminance of the LDR image is obtained by exponentiating I (which is described as being also performed by the LDR image generator module 16).

Equation (6) can be solved numerically, to obtain "I," using any of a number of techniques. A technique used by one embodiment of the gradient domain HDR compression system will be described below in connection with equations (10) through (12). Prior to describing that technique, and with further reference to equation (1), it will be noted that "G(x,y)" is also defined in terms of the gradient attenuation function $\Phi(x,y)$. As noted above, the gradient attenuation function preferably reduces relatively large gradients, and increases relatively low gradients, while doing so on a progressive basis. This will provide, for example, in the case of reduction of relatively large gradients, a larger reduction for larger gradients than smaller gradients. Contrariwise, in the case of increasing relatively low gradients, it will provide a larger increase for smaller gradients than larger gradients.

In one embodiment, the gradient domain HDR compression system generates values for the gradient attenuation function $\Phi(x,y)$ for use in generating values for $G(x,y)$ (equation (1)) as follows. Initially, the gradient domain HDR compression system generates, from the logarithm $H(x,y)$ of the HDR image, a "Gaussian pyramid" $H_0, H_1, \ldots, H_d$, comprising a series of levels, with each level being identified by an subscript index $k=0, 1, \ldots, d$. Generally, in a Gaussian pyramid of an image, the lowest level in the pyramid "$H_0$" would represent, for example, the original image, and the image "$H_k$" at each higher level "k" would represent an image "$H_{k-1}$" at a lower resolution than the next lower "k−1" level. As an illustration, each pixel at location (i,j) in the level "k" can be generated from a plurality of pixels (m,n) in the previous "k−1" level, for example, as follows $$H_k(i,j) = \sum_{m=-2}^{2} \sum_{n=-2}^{2} w(m,n) H_{k-1}(2i+m, 2j+n), \quad (7)$$

where w(m,n) represents a Gaussian weighting kernel, which can be provided to affect the contribution of various pixels in the 5 pixel-by-5 pixel window around the pixel at location (2i,2j) in the image $H_{k-1}$ at level (k−1). It will be appreciated that the Gaussian pyramid defined by equation (7) will provide the image defined by $H_k$ to have one-fourth the resolution as the image defined by $H_{k-1}$. It will further be appreciated that the difference in resolution as between levels in the Gaussian pyramid is determined by the coefficients for "i" and "j" on the right-hand side of equation (7); different differences in resolution as between levels of a Gaussian pyramid can be used with appropriate selections of the respective coefficients. The size and shape of the window can also differ from the one in equation (7) by modifying the range of "m" and/or "n."

After the gradient domain HDR compression system has generated the Gaussian pyramid, at each level "k" the gradients are determined using central differences, and a scaling factor $\phi_k(x,y)$ is generated for each pixel based on the magnitude of the gradient $\nabla H_k(x,y)$ at that point. In one embodiment, the gradient domain HDR compression system generates the scaling factor $\phi_k(x,y)$ as follows $$\phi_k(x,y) = \frac{\alpha}{\|\nabla H_k(x,y)\|} \left( \frac{\|\nabla H_k(x,y)\|}{\alpha} \right)^{\beta}, \quad (8)$$

where "$\|\nabla H_k(x,y)\|$" represents the magnitude of the gradient at the pixel at location (x,y) in the "k-th" level, and "α" and "β" are parameters to be determined. As noted above, the gradient attenuation function $\Phi(x,y)$ will reduce the magnitude of relatively large gradients, and increase the magnitude of relatively small gradients. The parameter "α" determines the magnitude at which the gradient will remain unchanged. The parameter "β" determines the direction in which the magnitudes will be changed. If the value of parameter "β" is selected to be strictly greater than "zero" and less than "one" (0<β<1), and also if the value of parameter "α" is strictly greater than zero (0<α), equation (8) will provide that, if the value of $\|\nabla H_k(x,y)\|$ is greater than the value of "α," the value of the scaling factor $\phi_k(x,y)$ will be less than "one." On the other hand if the value of $\|\nabla H_k(x,y)\|$ is less than the value of "α," the value of the scaling factor $\phi_k(x,y)$ will greater than "one." Finally, if the value of $\|\nabla H_k(x,y)\|$ equal to the value of "α," the value of the scaling factor $\phi_k(x,y)$ will be "one." Preferably, the value of parameter α is selected as a function of the average of the magnitudes of the gradients at each level. In one embodiment, satisfactory results were obtained by setting the value of α to one-tenth the average gradient magnitude, and the value of β to between 0.8 and 0.9.

After the gradient domain HDR compression system has generated, for each pixel in each level of the Gaussian pyramid, the value of the scaling factor $\phi_k(x,y)$, it will, starting with the scaling factors at the highest level "d," propagate the scaling factors down the pyramid to generate a gradient attenuation function $\Phi_k(x,y)$ at each level, as follows:

$$\Phi_d(x,y) = \phi_d(x,y)$$

$$\Phi_k(x,y) = L(\Phi_{k+1})(x,y)\phi_k(x,y)$$

$$\Phi(x,y) = \Phi_0(x,y) \quad (9).$$

The first line in equations (9) indicates that the gradient attenuation function $\Phi_d(x,y)$ at the highest level "d" in the Gaussian pyramid, that is, the level associated with the lowest resolution, corresponds to the scaling factors $\phi_d(x,y)$ that were generated for that level. The last line in equations (9) indicates that the final gradient attenuation function $\Phi(x,y)$, which will be used generating $G(x,y)$ as described above in connection with equation (1), is the gradient attenuation function $\Phi_0(x,y)$ that is generated for the lowest "zero-th" level in the Gaussian pyramid, which corresponds to the level associated with the highest resolution.

The middle line in equations (9) indicates that, at each level "k" in the Gaussian pyramid, other than the highest level "d," the gradient domain HDR compression system generates the gradient domain function using the set of scaling factors $\phi_k(x,y)$ generated for that level and the gradient domain function $\Phi_{k+1}$ that was generated for the next higher level "k+1," using an "upsampling operator" "L" for the gradient domain function $\Phi_{k+1}$. The upsampling operator L essentially relates elements of the array comprising the gradient domain function $\Phi_{k+1}$ to the elements of the array comprising set of scaling factors $\phi_k(x,y)$ that was generated for level "k." As noted above, since, the Gaussian pyramid, level "k" has, for example, four times the resolution of the resolution at level "k+1," the array comprising the set of scaling factors $\phi_k(x,y)$ that was generated for level "k" will also have four times the number of elements as the array comprising the gradient attenuation function $\Phi_{k+1}$ generated for level "k+1." In one embodiment, the upsampling operator L provides linear interpolation, so that (i) in generating the value of element (2i,2j) of the gradient attenuation function $\Phi_k(x,y)$ of level "k", the upsampling operator L provides the value of element (i,j) of the gradient attenuation function $\Phi_{k+1}(x,y)$ of level k+1;

(ii) in generating the value of element (2i−1,2j) of the gradient attenuation function $\Phi_k(x,y)$ of level "k", the upsampling operator L provides the linear interpolation between values of adjacent elements (i,j) and (i−1,j) in the same row of the gradient attenuation function $\Phi_{k+1}(x,y)$ of level k+1; and (iii) in generating the value of element (2i,2j) of the gradient attenuation function $\Phi_k(x,y)$ of level "k", the upsampling operator L provides the linear interpolation between values of adjacent elements (i,j) and (i,j−1) in the same column of the gradient attenuation function $\Phi_{k+1}(x,y)$ of level k+1.

By generating the gradient attenuation function $\Phi(x,y)$ in the manner described above, the scaling of H(x,y) in equation (I) that is provided by gradient attenuation function will reflect the strengths of the edges, from different resolution scales, passing through the respective location (x,y) in the HDR image.

Referring again to equation (1), G(x,y) is generated for each pixel in the HDR image using the gradient $\nabla H(x,y)$ and the gradient attenuation function $\Phi(\|\nabla H\|)$. Since only the gradient attenuation function $\Phi(\|\nabla H\|)$ is generated in a multiple-resolution manner, only the gradients $\nabla H(x,y)$ at the finest resolution, namely that associated with level zero, will be manipulated. This allows the gradient domain HDR compression system to avoid halo artifacts in the LDR image, which can occur if different resolution levels are manipulated separately.

As noted above in connection with equation (6), after the gradient domain HDR compression system has generated the values for G(x,y), it will use them to generate the values for "I," which are the logarithms of the values for the luminances of the LDR image that is to be generated. Since equation (6) is a partial differential equation, its solution, up to an additive term, can be determined in part by specifying the boundary conditions. In one embodiment, the boundary conditions are selected such that the gradient of "I" in the direction of the normal to the boundary of the LDR image is zero, that it $\nabla I \cdot n = 0$, where "n" is a vector in the direction normal to the boundary. The particular value that is selected for the additive constant is generally unimportant, since the gradient domain HDR compression system can shift and scale the final LDR image to fit the limitations of the particular output device that will be used to display, print or otherwise output the LDR image.

Since the Laplacian and divergence operators are linear operators, the solution to equation (6) can be approximated by use of a finite difference methodology. In that methodology, the gradient domain HDR compression system approximates the Laplacian $\nabla^2 I$ as follows:

$$\nabla^2 I(x, y) \approx \qquad (10)$$
$$I(x+1, y) + I(x-1, y) + I(x, y+1) + I(x, y-1) - 4I(x, y).$$

Similarly gradient domain HDR compression system approximates the "x" and "y" components of the gradients $\nabla I_x$ and $\nabla I_y$, for use in connection with the boundary conditions, using forward finite differences as follows:

$$\nabla I_x(x,y) = I(x+1,y) - I(x,y)$$

$$\nabla I_y(x,y) = I(x,y+1) - I(x,y) \qquad (11)$$

where $\nabla I_x(x,y)$ and $\nabla I_y(x,y)$ are the "x" and "y" components of the gradient $\nabla I$ at point (x,y). Similarly, the gradient domain HDR compression system generates the approximations of the divergence of "G" using backward finite differences as follows:

$$divG(x,y) \approx G_x(x,y) - G_x(x-1,y) + G_y(x,y) - G_y(x,y-1) \qquad (12)$$

where $G_x(x,y)$ and $G_x(x-1,y)$ are the "x" components of G at points (x,y) and (x−1,y), respectively, and $G_y(x,y)$ and $G_y(x,y-1)$ are the "y" components of G at points (x,y) and (x,y−1), respectively.

Although the gradient domain HDR compression system has been described as using "forward finite differences" in approximating values for $\nabla I_x(x,y)$ and $\nabla I_y(x,y)$ (that is, generating $\nabla I_x(x,y)$ as I(x+1,y)−I(x,y), and so forth, as described above in connection with equation (11)), and "backward finite differences" in approximating the values for div G(x,y) (that is, using $G_x(x,y)$ and $G_x(x-1,y)$ and so forth, as described above in connection with equation (12)), it will be appreciated that the gradient domain HDR compression system may also use forward finite differences in approximating the values for div G(x,y) and backward finite differences in approximating the values for $\nabla I_x(x,y)$ and $\nabla I_y(x,y)$. It is preferable that the gradient domain HDR compression system use the different finite differences for approximating the values for div G(x,y), on the one hand, and the values for $\nabla I_x(x,y)$ and $\nabla I_y(x,y)$, on the other hand, since that is consistent with the central finite difference scheme used to approximate the value for the Laplacian. However, it will be appreciated that the gradient domain HDR compression system may use a forward or a backward finite difference scheme in approximating both the values for div G(x,y) and $\nabla I_x(x,y)$ and $\nabla I_y(x,y)$.

The gradient domain HDR compression system will use the approximated values for G(x,y) generated using equation 12, along with equation (10) to establish a system of linear equations that will then be solved to generate approximate values for each I(x,y). Each pixel at location (x,y) in the LDR image will be associated with an equation, and so the system of equations will be relatively large for an image with a large number of pixels, but each of the pixels will only be associated with five unknown values as noted on the right-hand side of equation (10) above. The boundary conditions are used in connection with pixels on the boundary. For example, for each pixel on the left-hand boundary, I(−1,y)−I(0,y)=0, in which case the right-hand side of equation (10) reduces to I(1,y)+I(0,y+1)+I(0,y−1)−3I(0,y), for pixels that are not also along the upper and lower boundary. The boundary condition is used in connection with pixels along other boundaries in a similar manner.

After the gradient domain HDR compression system has established the system of linear equations as described above, it can solve the system to generate values for I(x,y) using any convenient methodology. One such methodology is the so-called Full Multi-grid Algorithm, described in W. Press, et al., Numerical Recipes in C, The Art of Scientific Computing, (Cambridge University Press, 1992), particularly pages 868, et seq., using Gauss-Seidel smoothing, which is described elsewhere in Numerical Recipes. Other methodologies known to those skilled in the art may also be employed.

The solution of the system of linear equations described above provides an array of values for I(x,y), with one value being associated with each pixel at location (x,y) of the LDR image. As noted above, each value is the logarithm of the value of the luminance L(x,y) of the pixel at location (x,y) in the LDR image, and, to generate the value of the luminance L(x,y), the gradient domain HDR compression system will exponentiate the value I(x,y).

As further noted above, the gradient domain HDR compression system operates to compress the gradients in the luminance of the HDR image. The gradient domain HDR compression system can use the luminance values L(x,y) to further generate color pixel values for the various color channels using any convenient methodology. In one embodiment, the gradient domain HDR compression system generates values for the various color channels in accordance with $$C_{LDR}(x, y) = \left(\frac{C_{HDR}(x, y)}{L_{HDR}(x, y)}\right)^s L_{LDR}(x, y), \quad (13)$$

where $C_{HDR}(x,y)$ represents the color value for the particular color channel for the pixel at location (x,y) in the HDR image, $L_{HDR}(x,y)$ represents the luminance value for the pixel at that location, $L_{LDR}(x,y)$ represents the luminance value generated for the pixel at the same location in the LDR as described above, and $C_{LDR}(x,y)$ represents the color value for the same color channel for the pixel at the same location in the LDR. The value of the exponent "s" can be adjusted to control the color saturation of the resulting LDR image. In one embodiment, satisfactory LDR image results were obtained for values of exponent "s" between 0.4 and 0.6. It will be appreciated that the operations described in connection with equation (13) are performed by the image post-processor module 17.

The invention provides a number of advantages. In particular, the invention provides a gradient domain HDR compression system 10 that reduces the dynamic range of an input image, which has been referred to as an HDR image, to provide a LDR image having a reduced dynamic range. The reduction is performed in connection with gradients in the HDR image, so that large changes are reduced, while maintaining fine details.

It will be appreciated that numerous changes and modifications may be made to the system 10 described herein. For example, although the gradient domain HDR compression system has been described above as making use of specific methodologies to generate the gradient attenuation function (reference equations (7) and (8)) and to solve the Poisson equation (equation (6), and reference equations (10) through (12)), it will be appreciated that other methodologies may be used instead.

In addition, although specific values have been suggested for the parameters α and β (reference equation (8)) and for exponent s (reference equation (13)), it will be appreciated that other values may be used to provide LDR images having particular characteristics.

In addition, although a specific example of the dynamic range of an HDR image has been referenced, as well as the dynamic range of an output device with which an LDR image may be used, it will be appreciated that, the terms "HDR" and "LDR" as used herein reference the dynamic range of the input image to be provided to the gradient domain HDR compression system relative to the dynamic range of the output image generated by the system, and do not indicate any specific dynamic range for either the HDR image or the LDR image.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner.

In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A gradient domain compression system for generating, from an input image having a high luminance dynamic range, an output image having a lower luminance dynamic range, the system comprising:
   (a) a gradient image generator module configured to generate, from the input image, a gradient image representing, for respective points of the input image, gradients in the luminance of the input image wherein gradients comprise a vector of at least two-dimensions;
   (b) a gradient compression module configured to receive the gradient image and generate a compressed range gradient image in which the range of gradients are compressed; and
   (c) an output image generator module configured to receive the compressed range gradient image and to generate therefrom an image, the image generated by the output image generator module comprising the output image.

2. A system as defined in claim 1 in which the gradient compression module comprises:
   (a) a gradient attenuation function generator module configured to generate, for respective points in the gradient image, a gradient attenuation function whose value for respective points in the gradient image is configured to reduce the range of gradients in the gradient image; and
   (b) an attenuated image gradient generator module configured to generate, from the gradient image and the gradient attenuation function, the compressed range gradient image.

3. A system as defined in claim 2 in which the gradient attenuation function generator module is configured to generate the gradient attenuation function to provide values for respective points of the gradient image so as to reduce relatively high gradients in a progressive manner, such that higher gradients are reduced more than lower gradients.

4. A system as defined in claim 2 in which the gradient attenuation function generator module is configured to generate the gradient attenuation function to provide values for respective points of the gradient image so as to increase relatively low gradients in a progressive manner, such that lower gradients are increased more than higher gradients.

5. A system as defined in claim 2 in which the gradient attenuation function generator module is configured to generate the gradient attenuation function whose value for respective points in the gradient image is configured to reduce the range of gradients in the gradient image around a selected gradient in the gradient image.

6. A system as defined in claim 2 in which the gradient attenuation function generator comprises:

(a) a Gaussian pyramid generator module configured to generate a Gaussian pyramid comprising a series of levels, each level of the Gaussian pyramid comprising a level gradient image having a reduced resolution than the level gradient image of the preceding level in the series;

(b) a level scaling factor generator module configured to generate, for respective level gradient images of the Gaussian pyramid, a respective level scaling factor representative of the gradient attenuation function at the particular level; and (c) a scaling factor propagator module configured to propagate the level scaling factors through the Gaussian pyramid, thereby to generate the gradient attenuation function for use by the attenuated image gradient generator module.

7. A system as defined in claim 1 in which output image generator module is configured to generate the output image as the image that is close to the compressed range gradient image in a least-squares sense.

8. A system as defined in claim 7 in which the output image generator module is configured to generate the output image in such that the Laphcian of the output image corresponds to the divergence of the compressed range gradient image.

9. A system as defined in claim 1 further comprising a preprocessor module configured to generate, in response to the input image, a preprocessed image comprising the logarithm of the input image, the gradient image generator module being configured to use the preprocessed image as its input image.

10. A system as defined in claim 1 further comprising a post-processor module configured to generate, in response to the output image generated by the output image generator module, a post-processed image comprising the exponential of the output image, the post-processed image comprising the output image of the system.

11. A gradient domain compression method of generating, from an input image having a high luminance dynamic range, an output image having a lower luminance dynamic range, the method comprising:

(a) a gradient image generator step of generating, from the input image, a gradient image representing, for respective points of the input image, gradients in the luminance of the input image wherein gradients comprise a vector of at least two-dimensions;

(b) a gradient compression step of receiving the gradient image and generating a compressed range gradient image in which the range of gradients are compressed; and (c) an output image generator step of receiving the compressed range gradient image and generating therefrom an image, the image generated during the output image generator step comprising the output image.

12. A method as defined in claim 11 in which the gradient compression step comprises:

(a) gradient attenuation function generator step of generating, for respective points in the gradient image, a gradient attenuation function whose value for respective points in the gradient image is configured to reduce the range of gradients in the gradient image; and (b) an attenuated image gradient generator step of generating, from the gradient image and the gradient attenuation function, the compressed range gradient image.

13. A method as defined in claim 12 in which the gradient attenuation function generator step includes the step of generating the gradient attenuation function to provide values for respective points of the gradient image so as to reduce relatively high gradients in a progressive manner, such that higher gradients are reduced more than lower gradients.

14. A method as defined in claim 12 in which the gradient attenuation function generator step includes the step of generating the gradient attenuation function to provide values for respective points of the gradient image so as to increase relatively low gradients in a progressive manner, such that lower gradients are increased more than higher gradient.

15. A method as defined in claim 12 in which the gradient attenuation function generator step includes the step of generating the gradient attenuation function whose value for respective points in the gradient image is configured to reduce the range of gradients in the gradient image around a selected gradient in the gradient image.

16. A method as defined in claim 12 in which the gradient attenuation function generator step comprises:

(a) a Gaussian pyramid generator step of generating a Gaussian pyramid comprising a series of levels, each level of the Gaussian pyramid comprising a level gradient image having a reduced resolution than the level gradient image of the preceding level in the series;

(b) a level scaling factor generator step of generating, for respective levels gradient images of the Gaussian pyramid, a respective level scaling factor representative of the gradient attenuation function at the particular level; and (c) a scaling factor propagator step of propagating module the level scaling factors through the Gaussian pyramid, thereby to generate the gradient attenuation function for use during the attenuated image gradient generator step.

17. A method as defined in claim 11 in which output image generator step includes the step of generating the output image as the image that is close to the compressed range gradient image in a least-squares sense.

18. A method as defined in claim 17 in which the output image generator step includes the step of generating the output image in such that the Laphcian of the output image corresponds to the divergence of the compressed range gradient image.

19. A method as defined in claim 11 further comprising a preprocessor step of generating, in response to the input image, a preprocessed image comprising the logarithm of the input image, the gradient image generator step making use of the preprocessed image as its input image.

20. A method as defined in claim 11 further comprising a post-processor configured to generate, in response to the output image generated by the output image generator module, a post-processed image comprising the exponential of the output image, the post-processed image comprising the output image of the method.

21. A computer program product for use in connection with a computer to provide a gradient domain compression system for generating, from an input image having a high luminance dynamic range, an output image having a lower luminance dynamic range, the computer program product comprising a computer-readable medium having encoded thereon:

(a) a gradient image generator module configured to enable the computer to generate, from the input image, a gradient image representing, for respective points of the input image, gradients in the luminance of the input image wherein gradients comprise a vector of at least two-dimensions;

(b) a gradient compression module configured to enable the computer to receive the gradient image and generate a compressed range gradient image in which the range of gradients are compressed; and (c) an output image generator module configured to enable the computer to receive the compressed range gradient image and to generate therefrom an image, the image generated by the output image generator module comprising the output image.

22. A computer program product as defined in claim 21 in which the gradient compression module comprises:

(a) a gradient attenuation function generator module configured to enable the computer to generate, for respective points in the gradient image, a gradient attenuation function whose value for respective points in the gradient image is configured to enable the computer to reduce the range of gradients in the gradient image; and (b) an attenuated image gradient generator module configured to enable the computer to generate, from the gradient image and the gradient attenuation function, the compressed range gradient image.

23. A computer program product as defined in claim 22 in which the gradient attenuation function generator module is configured to enable the computer to generate the gradient attenuation function to provide values for respective points of the gradient image so as to reduce relatively high gradients in a progressive manner, such that higher gradients are reduced more than lower gradients.

24. A computer program product as defined in claim 22 in which the gradient attenuation function generator module is configured to enable the computer to generate the gradient attenuation function to provide values for respective points of the gradient image so as to increase relatively low gradients in a progressive manner, such that lower gradients are increased more than higher gradients.

25. A computer program product as defined in claim 22 in which the gradient attenuation function generator module is configured to enable the computer to generate the gradient attenuation function whose value for respective points in the gradient image is configured to enable the computer to reduce the range of gradients in the gradient image around a selected gradient in the gradient image.

26. A computer program product as defined in claim 22 in which the gradient attenuation function generator comprises:

(a) a Gaussian pyramid generator module configured to enable the computer to generate a Gaussian pyramid comprising a series of levels, each level of the Gaussian pyramid comprising a level gradient image having a reduced resolution than the level gradient image of the preceding level in the series;

(b) a level scaling factor generator module configured to enable the computer to generate, for respective levels gradient images of the Gaussian pyramid, a respective level scaling factor representative of the gradient attenuation function at the particular level; and (c) a scaling factor propagator module configured to enable the computer to propagate the level scaling factors through the Gaussian pyramid, thereby to generate the gradient attenuation function for use by the attenuated image gradient generator module.

27. A computer program product as defined in claim 21 in which output image generator module is configured to enable the computer to generate the output image as the image that is close to the compressed range gradient image in a least-squares sense.

28. A computer program product as defined in claim 27 in which the output image generator module is configured to enable the computer to generate the output image in such that the Laplcian of the output image corresponds to the divergence of the compressed range gradient image.

29. A computer program product as defined in claim 21 further comprising a preprocessor module configured to enable the computer to generate, in response to the input image, a preprocessed image comprising the logarithm of the input image, the gradient image generator module being configured to enable the computer to use the preprocessed image as its input image.

30. A computer program product as defined in claim 21 further comprising a post-processor module configured to enable the computer to generate, in response to the output image generated by the output image generator module, a post-processed image comprising the exponential of the output image, the post-processed image comprising the output image of the system.

* * * * *